Aug. 9, 1949.   R. S. ROBINSON   2,478,207
VIBRATING APPARATUS
Filed Sept. 5, 1945   2 Sheets-Sheet 1

INVENTOR.
RICHARD S. ROBINSON
BY
HIS ATTORNEY

Aug. 9, 1949.    R. S. ROBINSON    2,478,207
VIBRATING APPARATUS
Filed Sept. 5, 1945    2 Sheets-Sheet 2

INVENTOR.
RICHARD S. ROBINSON
BY
HIS ATTORNEY

Patented Aug. 9, 1949

2,478,207

UNITED STATES PATENT OFFICE 2,478,207

VIBRATING APPARATUS

Richard S. Robinson, Gloucester, Mass., assignor, by mesne assignments, to Raytheon Manufacturing Company, a corporation of Delaware Application September 5, 1945, Serial No. 614,511

9 Claims. (Cl. 259—1)

The present invention relates to a device for producing vibrations in a continuous flowing liquid and relates more particularly to apparatus of this nature in which the vibrating means is energized by use of the principles of magnetostriction. In the present invention the vibrational element comprising a magnetostrictive tube, closed at both ends, is axially positioned in a surrounding tube through which a liquid flows without entering within the magnetostrictive tube itself which is hermetically sealed and free from liquids. The magnetostrictive tube may be supported at its node and vibrated by means positioned externally of the enclosing tube.

In the present arrangement the apparatus is easily assembled and disassembled. The vibratory unit is so supported that it is not restricted in its vibration because of a liquid sealing joint to prevent the liquid being treated from escaping. The energizing coil of the magnetostrictive tube may be positioned externally of the enclosing tube; the enclosing tube in this case being preferably of non-magnetic material.

If desired, the magnetic path for the magnetostrictive vibrator may be completed by a magnetic circuit arranged externally of the enclosing tube. The magnetostrictive element will preferably be tuned for mechanical resonance at the operating frequency of the vibrator and the amplitude of the ends of the tube may be increased by properly adjusting the end masses forming the cap portion of the tube relative to the wall thickness of the tube.

Figure 1:
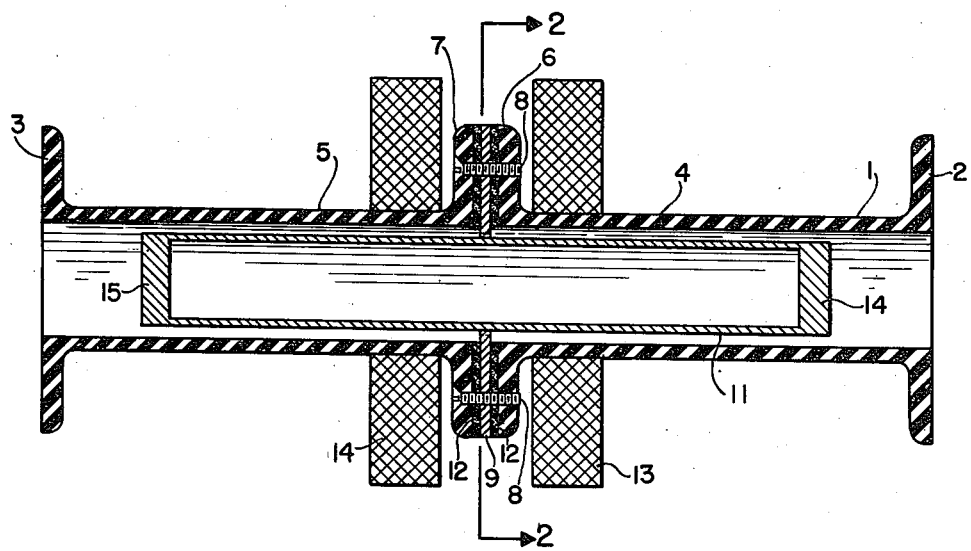
Figure 2:
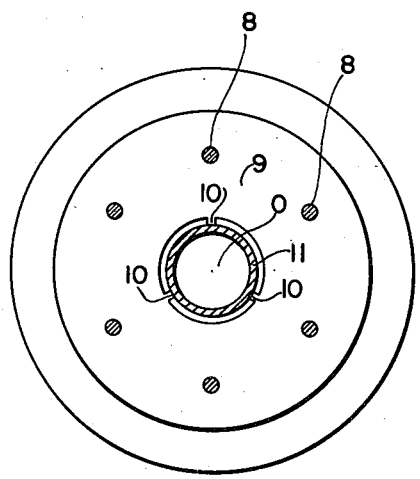
Figure 3:
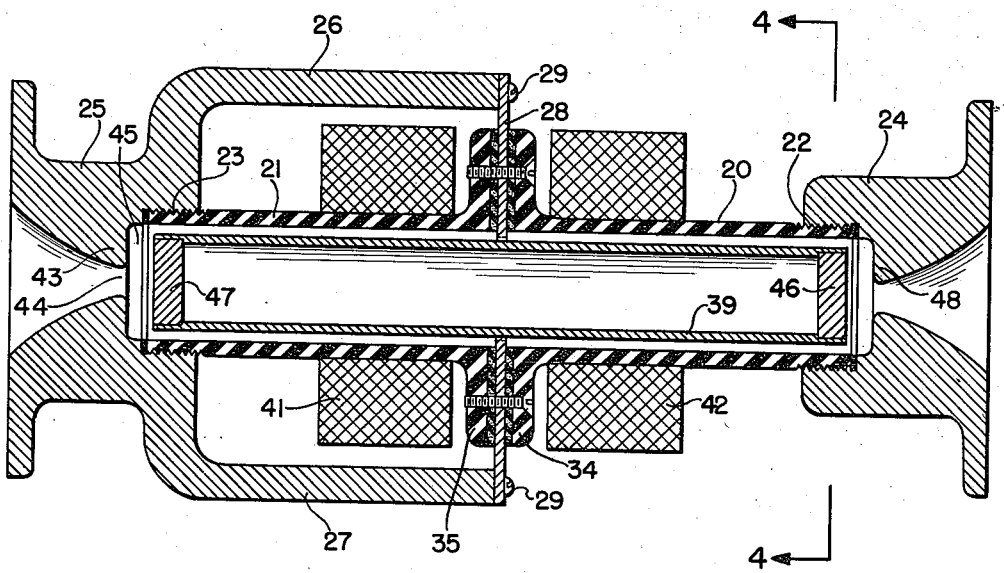
Figure 4:
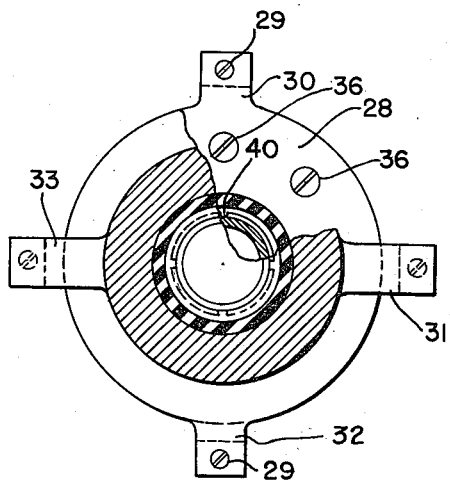

The invention will be more fully described in the specification when taken in connection with the drawings illustrating an embodiment thereof in which Fig. 1 shows a longitudinal section through the invention; Fig. 2 shows a section taken on the line 2—2 of Fig. 1; Fig. 3 shows a longitudinal section of a modified form of the invention; and Fig. 4 shows a section taken on the line 4—4 with fragmentary portions removed.

In the arrangement of Figs. 1 and 2 liquid may be passed through the enclosing tube 1 in either direction. The tube 1 is preferably of a non-conducting, non-magnetic material such as Bakelite, hard rubber or some plastic, and is provided at the ends with suitable joining flanges 2 and 3 or other suitable means, by means of which the device may be connected into a flow pipe for the liquid to be treated, in place of the flanges 2 and 3.

The enclosing tube may be threaded or a coupling joint may be used to couple the device into the flow system. This tube may be made in two sections 4 and 5, each of which is provided with a facing flange 6 and 7 respectively, which are held together by means of screws 8—8 suitably spaced about the periphery of the flanges. These flanges and the bolts 8 also retain a clamping disc or spider 9 which has a circular hole at the center with radial prongs 10—10—10 extending inwardly to the central axis 0 of the system. These radial prongs support in a symmetrical position with the central axis 0 the magnetostrictive tube 11 in such a manner that both the magnetostrictive tube and the enclosing tube have the same concentric axes. The spider or disc 9 is faced on either side with suitable gaskets 12 and 12 to provide a liquid type joint between the two halves 4 and 5 of the enclosed tube.

Surrounding the enclosing tube on either side of the flanged joint are energizing coils 13 and 14. The magnetostrictive tube 11 is supported by the disc 9 at the node of the tube, the tube being closed at both ends by cap members 14 and 15 serving as radiating faces for the ends of the tube. These cap ends may be comparatively thick so that the tube amplitude at these sections may be increased and in addition a uniform amplitude provided over the whole cap surface by making the end caps sufficiently stiff and rigid so that all portions of its surface move with substantially the same amplitude.

The operating frequency for the system is preferably in the supersonic range and frequencies may be selected and the system may be designed for operation from in the vicinity of the upper audible range to frequencies far above the audible range. The frequency to be used may be adapted for the particular material to be treated. If in the arrangement shown in Figs. 1 and 2 the liquid is fed into the system at the right and is removed at the left, the liquid will first be affected by the diaphragm or plate 14. The liquid will then go around the side walls of the tube for the whole length of the magnetostrictive tube to the opposite end 15 where the liquid will flow over the diaphragm 15 and again receive further treatment from the vibrations radiating from the cap 15 of the magnetostrictive tube. It will naturally follow that the velocity of flow about the side walls of the tube 11 will be higher than that at the end of the tube so that the treatment of the liquid in contact with the ends of the tube will be comparatively longer and more complete than if the same velocity of flow was maintained as that between the ends of the tube. In the arrangement indicated in Figs. 3 and 4 the sections 20 and 21 of the non-magnetic, non-metallic enclosing tubes are threaded at the ends 22 and 23 to receive similar end pieces 24 and 25. In Fig. 3 these similar end pieces are displaced 90° so that in the sectional view the extending arms 26 and 27 of the member 25 are shown whereas the corresponding members of the element 24 are not shown.

The arms 26 and 27 extending from the end coupling piece 25 form a yoke to which the spider 28 is attached by means of screws 29. This spider is formed with four extending arms 30, 31, 32 and 33, Fig. 4, two arms 30 and 32 attaching to the yoke pieces 26 and 27 while the two arms 31 and 33 attach to the corresponding yoke pieces in the member 24. The central portion of the plate or spider 28 extends between the coupling flanges 34 and 35 of the tube sections 20 and 21 respectively and is held in place between these flanges by means of the screws 36—36, etc.

The magnetostrictive tube 39 corresponding to the magnetostrictive tube in Fig. 1 is retained by the plate 28 in the same manner as the tube in Fig. 1, the plate 28 having projecting members 40 which retain the magnetostrictive tube 39 at its nodal point. Coils 41 and 42 on either side of the flanged joint provide energizing means for the electrical system. In the modification of Figs. 3 and 4 these coils may extend for some length over the enclosing tube. The coils are surrounded by a magnetic circuit comprising the plate 28, the arms 26 and 27 and the end coupling member 25, all of which are of magnetizable material. The coupling unit or end base 25 is preferably formed to provide an inwardly extending flange or shoulder 43 surrounding the central orifice 44.

Liquid flowing down the sides of the tube 39 on the external side flows around into the chamber 45 formed between the end caps 46 and 47 and the coupling flanges 43 and 48. The end caps 46 and 47 are also magnetizable material and a magnetic gap is therefore provided between the flanged shoulders 43 and the cap element 47. Similar magnetic path is provided for the coil 42. The magnetic circuit is therefore externally completed around the outside of the coils and internally completed through the walls of the magnetostrictive tube.

The tube 39 is tuned to resonance at the operating frequency similarly as the tube of Fig. 1. The operation of the arrangements in the modification in Figs. 3 and 4 is similar to that as previously described.

Having now described my invention, I claim:

1. A device for producing vibrations in a continuously flowing liquid which comprises a flow tube through which the liquid flows, a magnetostrictive tube totally contained within the flow tube and sealed at both ends excluding the liquid, means positioning said magnetostrictive tube concentrically within said flow tube, said means supporting said magnetostrictive tube at its vibrational node and coil means positioned externally of the flow tube on both sides of said node and surrounding the same for energizing said magnetostrictive tube.

2. A device for producing vibrations in a continuously flowing liquid which comprises a flow tube of non-electrical conductive material through which the liquid flows, a magnetostrictive tube totally contained within the flow tube and sealed at both ends excluding the liquid, means supporting said magnetostrictive tube at its vibrational node concentrically within the flow tube and parallel with it, said means having projecting elements projecting through the line of flow in said flow tube and contacting with said magnetostrictive tube for supporting same and coil means externally positioned of the flow tube on both sides of said node and surrounding the same for energizing said magnetostrictive tube.

3. A device for producing vibrations in a continuously flowing liquid which comprises a flow tube through which the liquid is adapted to flow, said flow tube having two similar portions with abutting flanges, a magnetostrictive tube closed at both ends excluding the liquid, means supported between said flanges for supporting said magnetostrictive tube at its node in a position concentric with said flow tube, and coil means externally positioned of said flow tube for energizing said magnetostrictive tube.

4. A device for producing vibrations in a continuously flowing liquid which comprises a flow tube through which the liquid is adapted to flow, said flow tube having two separate parts with abutting flanges by means of which said parts are joined together, a magnetostrictive tube closed at both ends excluding the liquid positioned concentrically within said flow tube, a supporting web held between said abutting flanges and having radially projecting fingers supporting said magnetostrictive tube at its node and coil means externally positioned of said flow tube for energizing said magnetostrictive tube.

5. A device for producing vibrations in a continuously flowing liquid which comprises a flow tube, a magnetostrictive tube closed at both ends, means positioning said magnetostrictive tube concentrically within said flow tube, said means supporting said magnetostrictive tube at its vibrational node, coil means positioned externally of the flow tube and surrounding the same for energizing said magnetostrictive tube, and means completing a magnetic circuit between said supporting means and the ends of the magnetostrictive tube comprising a yoke surrounding said coil and making contact with said supporting means and a fitting at the end of said flow tube opposite the ends of said magnetostrictive tube, said fitting, said yoke and said supporting means forming a magnetic path externally of the coil between the node and the ends of the magnetostrictive tube.

6. A device for producing vibrations in a continuous flow of liquid which comprises a flow tube formed in two collinearly disposed parts of non-magnetic material, a magnetostrictive tube closed at both ends, means mounted between confronting ends of said two parts and supporting said magnetostrictive tube at its node concentric with said flow tube, a pair of electric coils disposed on the outside of said flow tube, one on either side of said node for energizing said magnetostrictive tube and means completing a magnetic circuit around at least one of said coils between the node of the magnetostrictive tube and the end thereof.

7. A device for producing vibrations in a continuous flow of liquid which comprises a flow tube formed in two collinearly disposed parts of non-magnetic material, a magnetostrictive tube closed at both ends, means mounted between confronting ends of said two parts and supporting said magnetostrictive tube at its node concentric with said flow tube, a pair of electric coils disposed on the outside of said flow tube, one on either side of said node for energizing said magnetostrictive tube and means for completing a magnetic circuit around each of said coils between the node and the ends of the magnetostrictive tube.

8. A device for producing vibrations in a continuous flow of liquid which comprises a flow tube formed in two parts of non-magnetic material, a magnetostrictive tube closed at both ends, means supporting said magnetostrictive tube at its node concentric with said flow tube, a pair of electric coils wound on either side of said node for energizing said magnetostrictive tube and means completing a magnetic circuit around at least one of said coils between the node of the magnetostrictive tube and the end thereof, said last-named means including an end fitting over said supporting means.

9. A device for producing vibrations in a continuous flow of liquid which comprises a flow tube formed in two parts of non-magnetic material, a magnetostrictive tube closed at both ends, means supporting said magnetostrictive tube at its node concentric with said flow tube, a pair of electric coils wound on either side of said node for energizing said magnetostrictive tube and means completing a magnetic circuit around at least one of said coils between the node of the magnetostrictive tube and the end thereof, said last-named means including an end fitting over said supporting means, said end fitting providing a chamber over the end of the magnetostrictive tube with an outlet opening adapted to be connected in the flow path of the liquid.

RICHARD S. ROBINSON.

REFERENCES CITED

The following references are of record in the file of this patent:

UNITED STATES PATENTS

| Number | Name | Date |
| --- | --- | --- |
| 1,882,395 | Pierce | Oct. 11, 1932 |
| 1,882,397 | Pierce | Oct. 11, 1932 |
| 1,992,938 | Chambers et al. | Mar. 5, 1935 |
| 2,174,348 | Damond | Sept. 26, 1939 |